No. 814,191. PATENTED MAR. 6, 1906.
W. J. DEMMING.
MACHINE FOR THE MANUFACTURE OF GLASS BOTTLES AND THE LIKE.
APPLICATION FILED APR. 23, 1904.
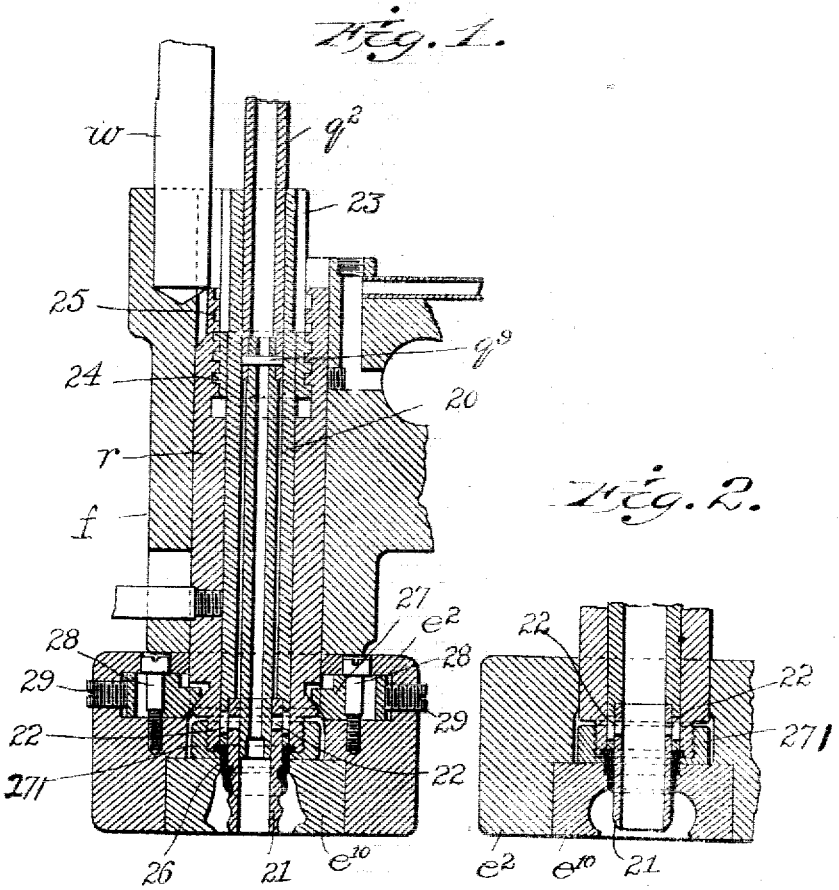

UNITED STATES PATENT OFFICE.

WILLIAM J. DEMMING, OF HORLEY, ENGLAND.

MACHINE FOR THE MANUFACTURE OF GLASS BOTTLES AND THE LIKE.

No. 814,191.  Specification of Letters Patent.  Patented March 6, 1906.

Application filed April 23, 1904. Serial No. 204,585.

*To all whom it may concern:*

Be it known that I, WILLIAM JOHN DEMMING, a citizen of the United States of America, residing at Horley, in the county of Surrey, England, have invented certain new and useful Improvements in and Relating to Machines for the Manufacture of Glass Bottles and the Like, of which the following is a specification.

This invention relates to glass-bottle-blowing machines, and is more especially applicable to machines for the manufacture of narrow-necked bottles.

The invention has also for its objects to more effectually form the mouths of the necks of the bottles so that there may be no waste due to improperly-formed necks, as is the case in existing machines for the manufacture of narrow-necked bottles; to provide means for projecting the mouth-forming nipple into the parison and withdrawing it at any time as may be required according to the quality of glass and other conditions which the skill of the operator will determine; to provide means for the ready renewal of the mouth-forming nipple, and to provide means for the interchange of nipples of various form and size as required according to the kind of bottle to be produced.

The invention, moreover, contemplates an improvement in the actual operation of plunging the parison and blowing the bottle, and also involves constructional features which are hereinafter more particularly described.

In carrying the invention into effect in its application to a machine for the manufacture of narrow-neck bottles I provide a rotating bracket upon which the neck and parison molds are hinged in such manner that the parison-mold is capable of being inverted for the charging operation and is capable of assuming a diametrically opposite position for the blowing and finishing to be performed. The mounting of the neck and parison molds in such manner and for such purpose is well known in machines of this class. Within the boss of the rotating bracket aforesaid I provide the plunger, which I advantageously mount within a sleeve, which latter is capable of a slight vertical displacement. The sleeve aforesaid is conveniently provided at its lower extremity with a boss having a flange or rim at its lower extremity provided to engage within a correspondingly shaped recess within the neck-mold parts in the manner hereinafter more particularly described. The said boss is bored out to receive a bush provided on its inner periphery with screw-threads, advantageously square threads. This bush is fixedly connected to the boss aforesaid by means of a screwed pin or by any other suitable means. Within the bush an internal nut is provided, having threads upon its outer periphery corresponding to and engaging with the screw-threads on the inner periphery of the bush. It will be understood that the plunger passes through the internal nut. The plunger is provided with an axial keyway throughout part of its length, the keyway being of such a length that no matter what the position of the plunger the plunger on its rotation shall be capable of causing the rotation of the internal nut for the purpose that will immediately appear. The internal nut is provided with an annular recess surrounding the plunger for the reception of the shank of the mouth-forming nipple. The shank is secured to the internal nut by means of a small screw, which is provided with a teat at its extremity which when the screw is turned home engages in a corresponding hole within the shank of the mouth-forming nipple, and thus effectually retains the nipple in position. By so providing the mouth-forming nipple it will be understood that there is no necessity of providing a screw-thread upon it or of machining it in any way, and the mouth-forming nipple may thus be provided of the hardest metal to withstand the great heat to which it is subjected in use. The bush aforesaid is provided with a hole sufficiently large for the passage through it of the screw aforesaid when it is required to renew or replace the mouth-forming nipple. According to the invention a molding-ring is provided independent of the mouth-forming nipple for the formation of the edge of the mouth, and this molding-ring is provided with a flange, by means of which it may be connected to the lower end of the bush aforesaid by means of a nut. By such a construction it will be understood that the nipple and the plunger may be plunged or withdrawn quite independently and at the proper moment and for a determined time, as may be required, according to the particular quality of the glass that is employed and other conditions of working. By so providing the plunger and the mouth-forming nipple with this capability of independent movement I contemplate according to the invention to form the neck by charging the mold with metal with the plunger completely withdrawn and the mouth-forming nipple almost completely withdrawn. I am then able to first project the mouth-forming nipple into the parison, and this movement can then be immediately followed by the movement of the plunger. The mouth-forming nipple may then be immediately withdrawn and the plunging and blowing operations may be partially or wholly effected with the nipple in its retracted position. By such means a great advantage results by reason of the mouth-forming nipple being in the casting position for the minimum time, and the life of the nipple is thus substantially prolonged.

In the provision of a screw-nipple for forming a screwing-mouth I may provide the molding-ring with a conical rim, and I may provide the ring with an internal screw exactly corresponding with the screw upon the screw-nipple, so that the screw-nipple may be passed to and fro within it.

I may effect the rotation of the plunger for retracting the internal nut and the nipple by means of a pinion sliding in a keyway provided on the plunger, the pinion being mounted at the top of the plunger-boss and being advantageously provided with a flange which is grooved or recessed, so that a fixed fork plate may be introduced within the annular groove or recess thus formed for maintaining the pinion in a fixed position with reference to the plunger, while permitting of its rotation by means of a toothed wheel or toothed segment operated by means of a handle or otherwise, as may be convenient.

It will be understood that I preferably provide the boss carrying the bush, internal nut, and nipple to have a slight vertical displacement, so that on the opening of the neck-molds means may operate—such as a spring or springs, lever or levers, or other simple mechanism—for bringing the molding-ring out of the mouth of the bottle on opening the neck-mold. This movement, it will be understood, is of small extent.

The plunger may be provided of a number of parts as may be required for constructional purposes, and it may be provided with a bore and transverse parts, which may be provided to correspond with ports or passages in the sleeve or in the carrying-bracket, so that the blowing operation may be performed in the retracted position of the plunger or otherwise in the manner well known in machines of this class.

The invention is illustrated in the accompanying drawings, in which—

Figure 1 represents a sectional elevation of the plunger-carrying bracket and neck-molds of a glass-bottle-blowing machine to which the invention is applied. Fig. 2 is a sectional elevation of a modification.

In Fig. 1 the invention is shown applied with a screw-mouth nipple, while in Fig. 2 it is shown applied with a corking-mouth nipple.

The plunger $q^2$, Fig. 1, is advantageously provided hollow with one part jointed to the other at $q^8$, while a sleeve 20 is provided, to which the nipple 21 is secured by means of buttons or grub-screws 22, which are provided with teats at their extremities which enter into holes provided in the shank or upper part of the nipple 21, so that thus there may be no necessity for providing the holes in the shank of the nipples with screws. The upper part of the sleeve 20 is provided with a long pinion 23, which gears with a toothed segment W, by which it is rotated as required in the operation of the machine.

Integral with the pinion 23 and sleeve 20 is a screw-nut 24, which works within the upper screwed part 25 of the sleeve $r$ in such manner that upon the rotation of the pinion 23 by means of the toothed segment W the sleeve 20 is moved upwardly or downwardly, according to the direction of movement of the toothed segment W, so as thus to lift up and rotate the screwed nipple 21 out of the neck-mold or to rotate it into the neck-mold, as required.

Upon the lower extremity of the sleeve $r$ a molding-ring 26 is provided by which the edge of the bottle is cast, and this molding-ring is maintained in position by means of a screw-nut 271, which rests upon the top of the neck-mold parts.

The neck-mold parts $e^2$ are recessed and provided with an annular recess in which segments 27 are provided with inclined faces, which on the closure of the mold engage with corresponding inclined faces formed upon the extremity of the sleeve $r$, so that the latter may be brought down in close contact with the neck-molding ring $e^{10}$. The segments are mounted in position by means of pins 28, and the position of the inclined edge of the segments 27 is determined by such means as grub-screws 29, as illustrated.

The air for blowing the parison may be introduced through the hollow plunger $q^2$ at the top, or it may be introduced as contemplated in the same way as described.

In Fig. 2 the same arrangement is provided; but the nipple 21 instead of being provided for making a screwed mouth is provided for making a corking-mouth. The same parts are indicated with the same letters in that figure as in Fig. 1.

What I claim as my invention, and desire to secure by Letters Patent, is—

1. In glass-bottle-blowing machines the combination with the neck-mold parts, of the annular molding-ring axially movable toward and from said neck-mold parts and the neck-mold nipple axially movable through said molding-ring so as to project within or be withdrawn from the neck-mold parts; substantially as described.

2. In glass-bottle-blowing machines, the combination with the neck-mold parts movable toward and from each other, the annular molding-ring and coöperating inclines for seating the molding-ring by the closing of the neck-mold parts, of the neck-mold nipple movable through the molding-ring into and out of the neck-mold parts; substantially as described.

3. In glass-bottle-blowing machines, the combination with the neck-mold parts and the annular molding-ring detachably mounted on an axially-movable support between the neck-mold parts, of the neck-mold nipple detachably mounted on a movable support to project through the molding-ring and between the neck-mold parts; substantially as described.

4. In glass-bottle-blowing machines, the combination with the axially-movable annular detachable molding-ring for forming the inner edge of the bottle-mouth, of the neck-mold nipple detachably mounted on a movable support independently of the molding-ring so as to move through the same in plunging the parison; substantially as described.

In witness whereof I have signed my name to this specification in the presence of two subscribing witnesses.

WM. J. DEMMING.

Witnesses:
WILLIAM SEWARD EVANS,
PAUL LINDNER.